Patented July 23, 1929.

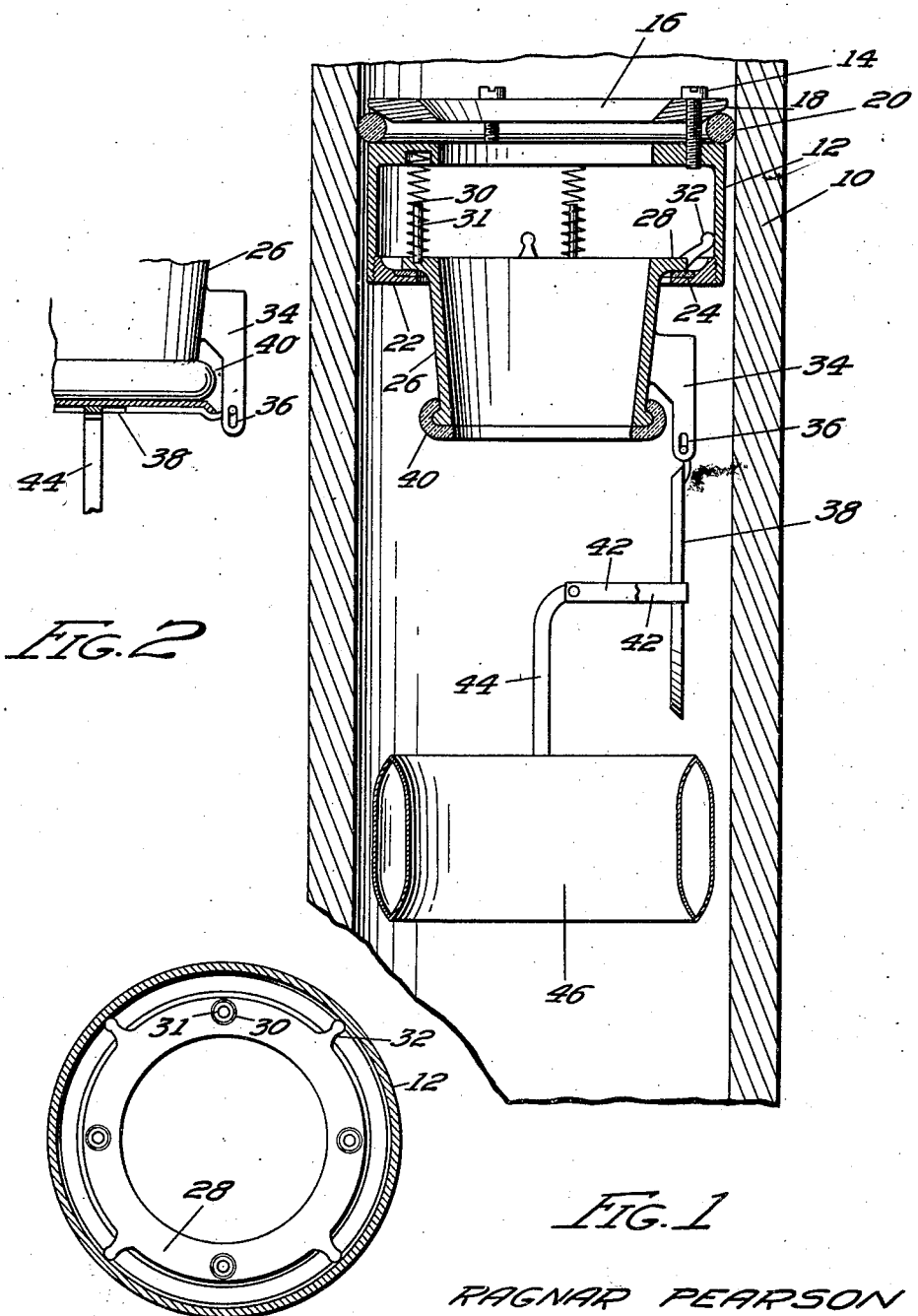

1,721,746

UNITED STATES PATENT OFFICE.

RAGNAR PEARSON, OF CHICAGO, ILLINOIS.

SAFETY CHECK VALVE.

Application filed July 19, 1928. Serial No. 293,971.

This invention relates to improvements in a check valve, and has for one of its principal objects the provision of a valve adapted to be placed in a drain pipe which will, in the event of backing up of sewage, automatically close, preventing overflowing of liquids above the drain levels.

One of the important objects of this invention is to provide in a drain or check valve a simple, yet effective valve of durable construction arranged to be automatically operated to close the inlet of a sewer drain or the like in the event of backing up or overflow of the water in the drain.

Another important object of the invention is the provision in a drain valve, of means for preventing the clogging of the closing member, or gate of the valve by solid matter which enters the inlet of the drain, and the consequential imperfect seating of the gate, which results in leakage past the valve, in the event of backing up of sewage. This is a highly important feature of this invention, especially in floor drains and the like, as a certain amount of dust and dirt is always entering the drain, regardless of the type of grating used to cover the entrance.

A further important object of this invention is the provision, in combination with a drain valve, of a float of toroidal shape, the central portion of the float being open. In floats heretofore used the construction of the same has been such that any dirt or solid material which may enter the drain will fall upon the float and remain there, hence increasing the weight of the same and consequently decreasing its efficiency and effectiveness. With the use of a toroidal float the central portion of the drain pipe will be unobstructed, thereby obviating this disadvantageous feature.

Another and still further important object of this invention is to provide means for cushioning the effect of the backup water upon the valve, for it has been found from experience that the water rises in the drain pipe at a rapid rate and that the valve closes with a snap, thereby straining the same and setting up abnormal stresses therein. The effect of cushioning the closing of the valve tends to eliminate these undesirable forces from the valve structure and therefore lengthens the life of the valve.

Other and further important objects of the invention will be apparent from the disclosures in the accompanying drawings and following specification.

The invention, in a preferred form, is illustrated in the drawings and hereinafter more fully described.

In the drawings:

Figure 1 is a vertical view, partly in section, showing the improved check valve of this invention applied to a drain pipe.

Figure 2 is a detail view of a portion of the valve gate and seat, illustrating in particular the valve gate hinge.

Figure 3 is a horizontal sectional view of the device.

As shown in the drawings:

The reference numeral 10 indicates generally a drain pipe of the type ordinarily used in basement drains or the like.

An inverted flanged ring 12 is adapted to be inserted in the pipe 10, and attached to the upper portion of the said ring by means of a plurality of screws 14 or the like is an annular ring 16 of the same diameter as the element 12. The lower outer edge of the ring 16 is beveled as at 18 and is adapted to compress and expand laterally a circular washer 20, preferably constructed of rubber or some other resilient material. The expansion of the member 20, it can be readily seen, frictionally engages the inner wall of the drain 10 and thereby retains the member 12 in position therein.

An annular collar 22 is threadedly mounted in the lower end of the flanged ring 12 and has embedded in the upper surface thereof a washer 24, preferably constructed of rubber or the like. A frustro-conical shaped member 26 is adapted to extend downwardly from the open portion of the ring 12 and is retained in the said desired position by means of an outwardly extending flange 28 integral with the member 26. A plurality of springs 30 act between the upper inner portion of the ring 12 and the flange 28. A plurality of guides 32 extend outwardly from the edge of the flange 28 and are integral therewith, the ends of the same being contiguous with the inner walls of the cup 12 and are adapted to guide the member 26 in a vertical direction. A plurality of upstanding pins 31 integral with the upper surface of the flange 28 are adapted to limit the upward travel of the member 26.

A downwardly extending arm 34 is integrally affixed to the outer surface of the member 26, and has an elongated opening 36 provided in the lower portion thereof which is adapted to serve as a hinge bearing for a valve gate 38. The said gate is circular in shape and is adapted to seat upon a circular bushing 40, preferably constructed of rubber or the like. The edge of the bushing 40 extends upwardly and is frictionally retained upon the mouth of the member 26.

It has been found from experiment that perfect seating of the gate upon the bushing 40 is very difficult to obtain. The vertical positioning of the hinge point 36 is very critical and is found to be one of the most important factors in this regard, hence, the provision of an elongated hinge bearing has been adopted to permit the hinge point to adjust itself when the gate is seated.

A pair of arms 42 are mounted upon the gate 38, one being positioned on each side of the said gate, diametrically opposite each other and each ninety degrees removed from the hinge 36 on the edge of the gate. Pivotally connected to the outer end of each of the arms 42 is a link 44. A toroidal shaped float 46 is suspended from the other ends of the links 44, the said links being pivotally connected thereto, at points diametrically opposite each other.

It can be readily seen that when water rises in the pipe 10, that is, back up water, the float will rise seating the gate upon the bushing 40 and forming a watertight closure therewith. It has been experimentally determined that the back up water usually rises rapidly and closes the gate with a snap, thereby setting up undue stresses in the entire valve structure. In order to compensate for this initial abnormal thrust, the resilient structure provided by the use of the springs 30 and the slidable characteristics of the member 26, take up the shock. When this initial shock has passed the member 26 returns to its normal position effecting a serviceable water-tight closure.

It is apparent that herein is provided a check valve whose structural characteristics ideally adapt it to conditions met with in practice. The self adjusting feature of the valve gate decreases the cost of production materially inasmuch as the gate hinge point needs no critical positioning. The toroidal float allows the free passage of débris and dirt through the drain, none of the same accumulating on the float and weighting it. And in addition, the life of the valve structure is increased by the provision of the shock absorbing construction of the same.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. In a drain valve for a sewer pipe, an annular member adapted to be fitted into the interior of a drain pipe, a gate hingedly mounted upon the annular member and means for seating the gate upon the lower opening of the annular member when water rises in the pipe, said means comprising a float, toroidal in shape and link means of connection between the gate and the float.

2. In a drain valve for a sewer pipe, an annular member adapted to be fitted into the interior of a drain pipe, a gate hingedly mounted upon the annular member and means for seating the gate upon the lower opening of the annular member when water rises in the pipe, said means comprising a float, toroidal in shape and link means of connection between the gate and the float, and means for cushioning the effect of the rising water upon the closing of the gate.

3. In a drain valve for a sewer pipe, an annular member adapted to be fitted into the interior of a drain pipe, a gate hingedly mounted upon the annular member and means for seating the gate upon the lower opening of the annular member when water rises in the pipe, said means comprising a float, toroidal in shape and link means of connection between the gate and the float, and means for cushioning the effect of the rising water upon the closing of the gate, said means including a resilient valve seat.

4. In a drain valve for a sewer pipe, an annular member adapted to be fitted into the interior of a drain pipe, a gate hingedly mounted upon the annular member and means for seating the gate upon the lower opening of the annular member when water rises in the pipe, said means comprising a float, toroidal in shape and link means of connection between the gate and the float, and means for cushioning the effect of the rising water upon the closing of the gate, said means including a resiliently mounted valve seat.

5. In a unidirectional valve for a liquid conducting pipe, a flanged ring adapted to be inserted in the pipe, a beveled ring connected by screws to the flanged ring, and a resilient washer adapted to be retained between the flanged ring and the beveled ring, and expanded outwardly thereby, an annular member slidably mounted in the flanged ring, and means for closing an opening in the annular member, when water rises in the pipe.

In testimony whereof I affix my signature.

RAGNAR PEARSON.